United States Patent
James

(10) Patent No.: US 9,644,973 B2
(45) Date of Patent: May 9, 2017

(54) INDOOR LOCATION SIGNALLING VIA LIGHT FITTINGS

(71) Applicant: Google Inc., Mountain View, CA (US)

(72) Inventor: Martyn James, Sheffield (GB)

(73) Assignee: Google Inc., Mountain View, CA (US)

( * ) Notice: Subject to any disclaimer, the term of this patent is extended or adjusted under 35 U.S.C. 154(b) by 354 days.

(21) Appl. No.: 14/225,878

(22) Filed: Mar. 26, 2014

(65) Prior Publication Data
US 2015/0153160 A1 Jun. 4, 2015

Related U.S. Application Data

(60) Provisional application No. 61/806,002, filed on Mar. 28, 2013.

(51) Int. Cl.
| | | |
|---|---|---|
| *G01B 11/14* | (2006.01) | |
| *G01J 3/00* | (2006.01) | |
| *G05D 1/02* | (2006.01) | |
| *H04W 24/00* | (2009.01) | |
| *G01C 21/20* | (2006.01) | |
| *H04W 4/04* | (2009.01) | |

(52) U.S. Cl.
CPC .......... *G01C 21/206* (2013.01); *H04W 4/043* (2013.01)

(58) Field of Classification Search
CPC .... H04W 4/043; H04W 4/023; G01C 21/206; G01S 1/70; G01S 5/16; G01S 5/0252; G01S 19/48; G01S 5/0263; H04N 7/183; H04N 5/3532; H04N 5/374; H04N 5/23206; H04B 10/116; H04B 10/60; H04L 25/4902

USPC .......... 356/375, 51, 614; 455/456.1, 456.3, 455/456.6; 398/115, 118, 140; 379/201.06

See application file for complete search history.

(56) References Cited

U.S. PATENT DOCUMENTS

| | | | | |
|---|---|---|---|---|
| 2010/0110165 A1* | 5/2010 | Iizuka | ...... | G01S 17/08 348/50 |
| 2012/0022826 A1* | 1/2012 | Giesekus | ...... | G01S 1/70 702/150 |
| 2013/0026224 A1* | 1/2013 | Ganick | ...... | G01C 21/206 235/375 |
| 2013/0141555 A1* | 6/2013 | Ganick | ...... | G01S 1/70 348/61 |

OTHER PUBLICATIONS

Welch et al., "The HiBall Tracker: High-Performance Wide-Area Tracking for Virtual and Augmented Enviornments", Symposium on Virtual Reality Software and Technology, Dec. 20-22, 1999, pp. 1-11, <https://www.cs.unc.edu/~welch/media/pdf/VRST99_HiBall.pdf>.

(Continued)

*Primary Examiner* — Sunghee Y Gray
(74) *Attorney, Agent, or Firm* — Lerner, David, Littenberg, Krumholz & Mentlik, LLP

(57) ABSTRACT

Disclosed here are methods and systems that relate to determining a location of a mobile device in an indoor environment. The indoor environment is installed with one or more light sources at disparate locations. Each light source has a unique light attribute different from that of other light sources. The mobile device is equipped with a photosensor to detect light emissions by the light sources. The methods and systems described herein may determine the location of the mobile device based on the light detection by the photosensor.

19 Claims, 13 Drawing Sheets

(56) References Cited

OTHER PUBLICATIONS

Welch et al., "High-Performance Wide-Area Optical Tracking / The HiBall Tracking system", Presence: Teleoperators and Virtual Environments (10:1), Feb. 2001.

* cited by examiner

INDOOR LOCATION SIGNALLING VIA LIGHT FITTINGS

CROSS-REFERENCE TO RELATED APPLICATIONS

The present application claims the benefit of the filing date of U.S. Provisional Patent Application No. 61/806,002 filed Mar. 28, 2013, the disclosure of which is hereby incorporated herein by reference.

BACKGROUND OF THE INVENTION

A person, such as a pedestrian, a shopper, or a tourist, may use location based services available on a mobile device in an indoor environment. Such services may include indoor location positioning, indoor location navigation, indoor location-aware searching, commerce, and advertising, just to name a few.

However, existing technologies may fail to provide a cost-effective, power-conserving, and accurate solution for indoor positioning and navigation related services. Some known positioning mechanisms such as the Global Positioning System (GPS) and WiFi have various shortcomings. For instance, GPS is generally unavailable or otherwise inaccurate in indoor environments. WiFi networks may have a high cost associated with deploying access points in the indoor space. Furthermore, positioning based on WiFi may be error-prone due to environmental noise, including multipath interference.

BRIEF SUMMARY OF THE INVENTION

This document describes technologies, methods, systems, devices, and other mechanisms for determining a location of a mobile device in an indoor environment.

One aspect of the disclosure provides a method that stores location information associated with a plurality of light sources in an indoor space. Each light source is configured to provide illumination of the indoor space. Each light source is identifiable by emitting a unique light attribute in conjunction with the illumination. A processor identifies at least one of the plurality of light sources based on light information detected by a photosensor. The light information includes the unique light attribute. The method determines a location associated with each identified light source based on the stored location information and the unique light attribute. Additionally, the method determines a location of a device coupled to the photosensor based on the determined location associated with each identified light source.

Another aspect of the disclosure provides a system. The system includes a storage device storing location information associated with a plurality of light sources in an indoor space. Each light source is configured to provide illumination of the indoor space. Each light source is identifiable by a unique light attribute in conjunction with the illumination. The system also includes a processor in communication with the storage device. The processor is configured to identify at least one of the plurality of light sources based on light information detected by a photosensor. The light information includes the unique attribute. The processor is also configured to determine a location associated with each identified light source based on the stored location information and the unique light attribute. Additionally, the processor is configured to determine a location of a device coupled to the photosensor based on the determined location associated with each identified light source.

Yet another aspect of the disclosure provides a system. The system comprises a means for storing location information associated with a plurality of light sources in an indoor space. Each light source is configured to provide illumination of the indoor space. Each light source is identifiable by a unique light attribute in conjunction with the illumination. The system also comprises a means for identifying at least one of the plurality of light sources based on light information detected by a photosensor. The light information includes the unique light attribute. The system also includes a means for determining a location associated with each identified light source based on the stored location information and the unique light attribute. The system further includes a means for determining a location of a device coupled to the photosensor based on the determined location associated with each identified light source.

The unique light attribute may include one of an intermittent frequency, light emission frequency, wavelength and intensity. The unique light attribute may not be perceivable by a user's naked eye.

The system may include a means for identifying at least two of the plurality of light sources based on the light information detected by the photosensor. The system may also include a means for determining a location associated with each of the at least two of the plurality of the light sources. Additionally, the system may include a means for determining a location of the photosensor by triangulating the determined location associated with each of the at least two of the plurality of light sources.

A further aspect of the disclosure provides a method for storing a map of an indoor space having a plurality of light sources. The map includes light information detectable at one or more locations on the map. The light information associated with each of the one or more locations includes a light intensity from at least one of the plurality of light sources. The method receives light information detected by a photosensor. A processor identifies at least one of the plurality of light sources based on the received light information. The method determines a light intensity from each identified light source based on the received light information. Additionally, the method compares the determined light intensity from each identified light source with the light information detectable at the one or more locations on the map. A location of the photosensor is determined based on the comparison.

A yet further aspect of the disclosure provides a system. The system includes a storage device storing a map of an indoor space having a plurality of light sources. The map includes light information detectable at one or more locations on the map. The light information associated with each of the one or more locations includes a light intensity from at least one of the plurality of light sources. The system also includes a processor in communication with the storage device. The processor is configured to receive light information detected by a photosensor, and identify at least one of the plurality of light sources based on the received light information. The processor is also configured to determine a light intensity from each identified light source based on the received light information. The processor is configured to compare the determined light intensity from each identified light source with the light information detectable at the one or more locations on the map. The processor is also configured to determine a location of the photosensor based on the comparison.

Another aspect of the disclosure provides a system comprising a means for storing a map of an indoor space having a plurality of light sources. The map includes light information detectable at one or more locations on the map. The light information associated with each of the one or more locations includes a light intensity from at least one of the plurality of light sources. Additionally, the system comprises a means for receiving light information detected by a photosensor. The system also comprises a means for identifying at least one of the plurality of light sources based on the received light information. Further, the system comprises a means for determining a light intensity from each identified light source based on the received light source. Still further, the system comprises a means for comparing the determined light intensity from each identified light source with the light information detectable at the one or more locations on the map. The system also comprises a means for determining a location of the photosensor based on the comparison.

Each of the plurality of light sources may be identifiable by the processor based on a unique light attribute associated with each light source. The unique light attribute is detectable by the processor. The unique light attribute may include one of an intermittent frequency, light emission frequency, wavelength, and intensity.

Yet another aspect of the disclosure provides a system comprising a plurality of light sources. Each light source includes a lamp configured to emit light. Each light source also includes a device coupled to the lamp. The device is configured to effect light emission by the light source based on a unique light attribute associated with the light source. The unique light attribute is detectable by a photosensor but not perceivable by a user's naked eye.

Still yet another aspect of the disclosure provides a system. The system comprises a plurality of light sources. Each light source includes a means for emitting light. Additionally, each light source includes a means for effecting light emission by the light source based on a unique light attribute associated with the light source. The unique light attribute is detectable by a photosensor but not perceivable by a user's naked eye.

The unique light attribute may produce a unique intermittent frequency detectable by the photosensor. The unique light attribute may include one of an intermittent frequency, light emission frequency, wavelength, and intensity.

The means for effecting light emission may emit an electromagnetic wave at a unique light emission frequency detectable by the photosensor. Each light source may emit light in one or more of the following spectra: visible light, infrared, and ultraviolet spectra.

The foregoing summary is illustrative only and is not intended to be in any way limiting. In addition to the illustrative aspects, embodiments, and features, described above, further aspects, embodiments, and features will become apparent by reference to the drawings and the following detailed description.

BRIEF DESCRIPTION OF THE DRAWINGS

In the drawings, similar reference numbers and acronyms may identify elements or acts with the same or similar functionality for ease of understanding and convenience, unless context dictates otherwise.

DETAILED DESCRIPTION

The following description provides specific details of aspects of the technologies detailed herein. The headings and subheadings provided herein are for convenience and ease of reading only.

1. Overview

The technologies described herein generally relate to determining a location of a mobile device in an indoor space based at least in part on detecting at least one light source in the indoor space using the mobile device, where the location of the light source is predetermined.

Figure 1:
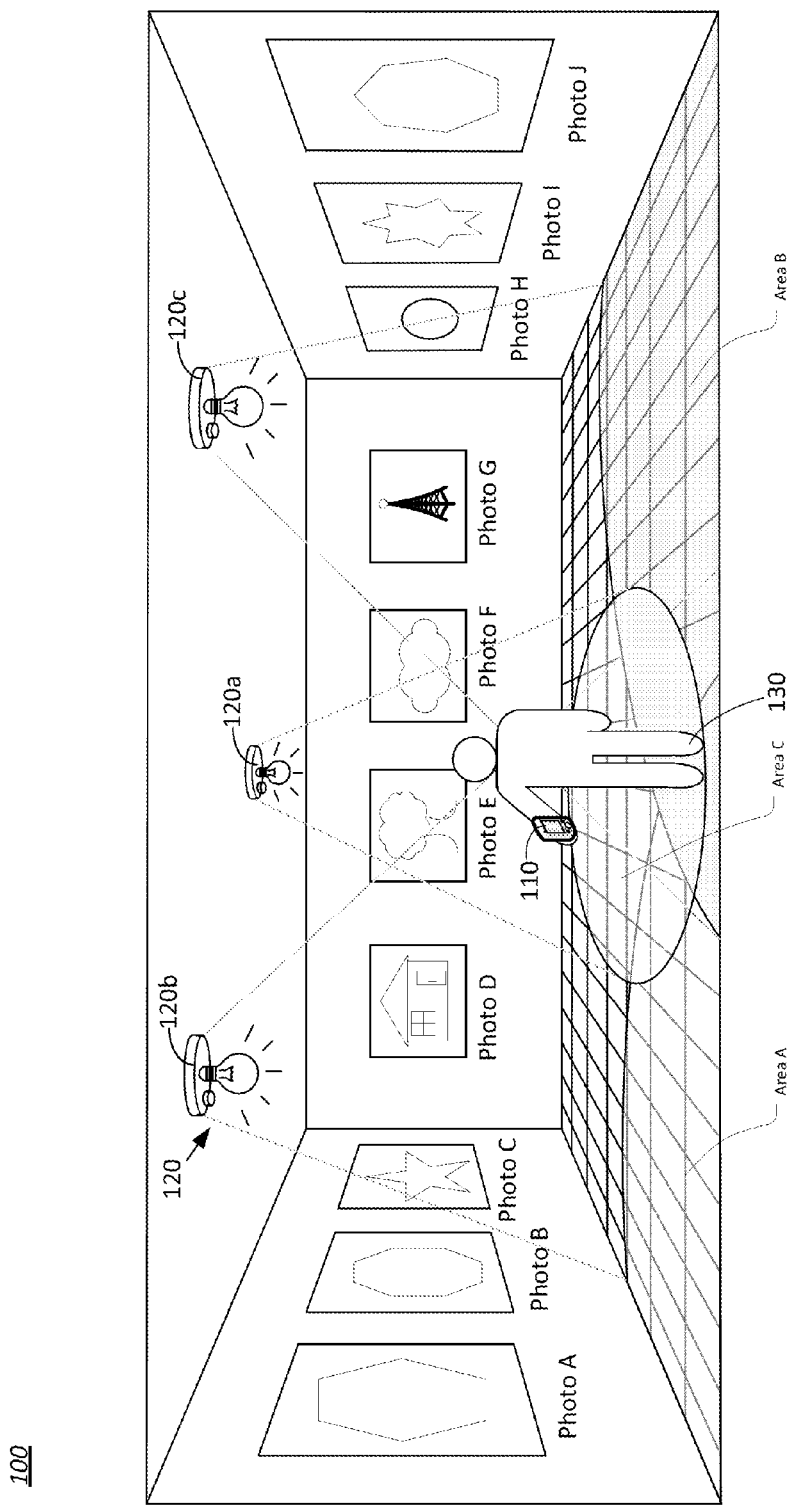
FIG. 1 is an indoor space that employs a system in accordance with aspects of the disclosure.

FIG. 1 illustrates an example indoor environment 100 with one or more light sources 120a-120c installed therein. The indoor environment 100 may be any type of an indoor space such as an art gallery, museum, department store, apartment building, or office building, just to name a few.

Each light source 120 may have a unique light attribute (e.g., flicker frequency, light emission frequency, or wavelength), and may be uniquely identified by its unique light attribute. For instance, in one embodiment, each light source may flicker or effect intermittent illumination at a unique frequency or set of frequencies. Alternatively, each light source may emit electromagnetic waves at a unique frequency. The arrangement of light sources shown in FIG. 1 is merely exemplary and many different variations are possible.

With continued reference to FIG. 1, a user 130 in the indoor environment 100 may carry a mobile device 110. The mobile device 110 may be mounted on or carried in an object associated with the user 130, such as in a pocket, or in a purse, among other possibilities. Alternatively, the mobile device 110 may be connected to the user, such as worn on the user's belt, shoe or waist, or held in a hand, among other possibilities.

The mobile device 110 may have a light detector, e.g., a photosensor, implemented therein, to detect the presence of one or more light sources based on their light attributes. Based on the light attributes detected by the photosensor, a server may identify the light sources detected by the photosensor, retrieve location information of the identified light sources, and determine location of the mobile device 110 based on the location information of the identified light sources.

In situations in which systems discussed herein may collect or use information about a user, the user may be provided with an opportunity to control such collection and usage. Such information may include the current location of the user. The user may have control over how information is collected and how such information may be used by a content server. In one example, the user may refuse to grant a system, including a program or a feature, to collect user-related information. In another example, the user may control how a system receives content from a content server, where the content is relevant to the user. In addition, certain data may be treated in one or more ways before storage or usage, so that information pertaining to the user is removed. For example, the user's identity may be removed so that no personally identifiable information can be determined about the user.

2. Example System

Figure 2:
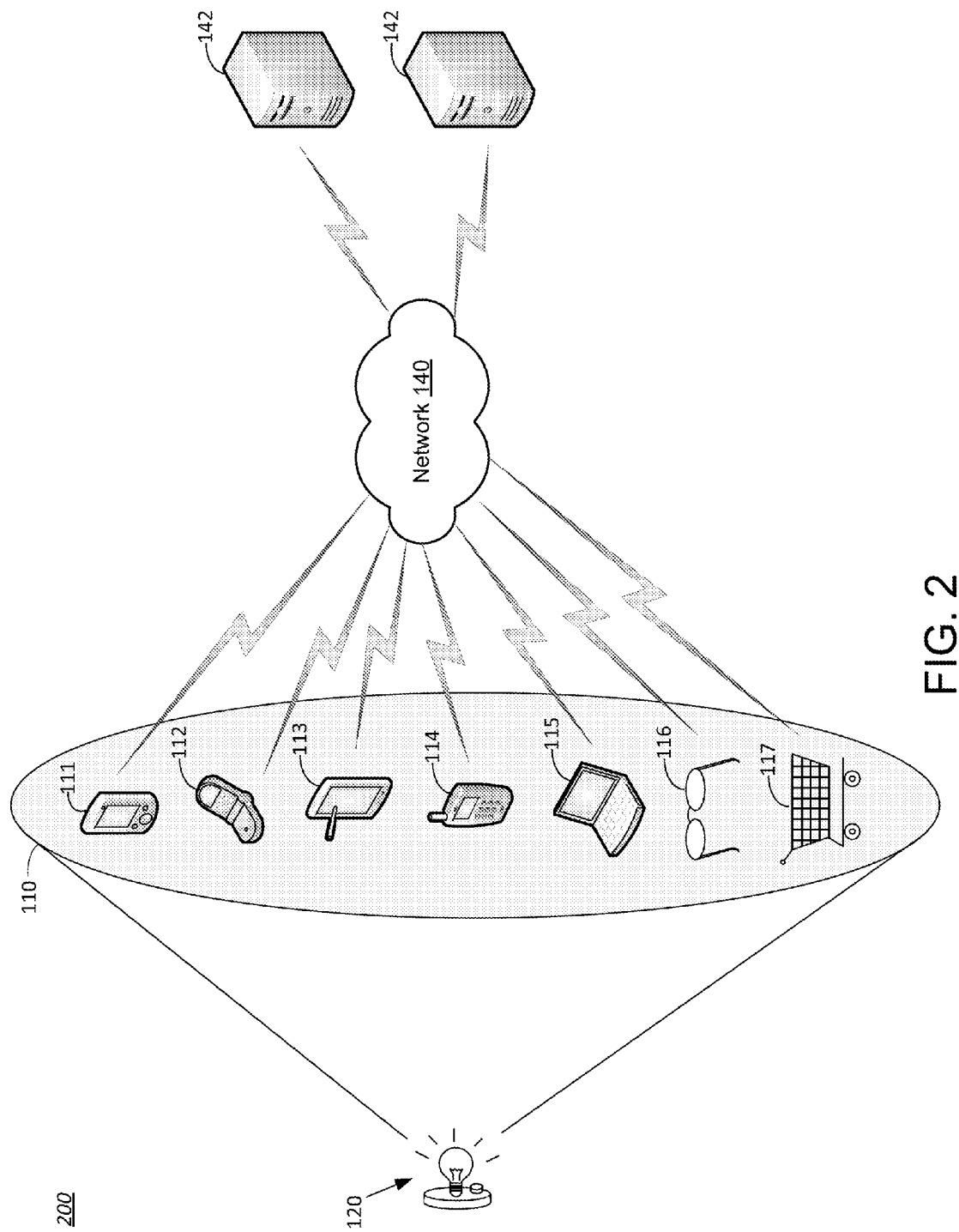
FIG. 2 illustrates an example system in accordance with aspects of the disclosure.

FIG. 2 is a simplified schematic diagram of an example system 200 that implements the mechanism about determining a mobile device location.

As shown, the system 200 may include one or more light sources 120. Each light source 120 may emit electromagnetic waves in one or more of the following spectra: visible light, infrared and ultraviolet spectrums, among other possibilities. As used herein, emissions in these different spectra are referred to as "light" emissions. The light emitted by a light source 120 may be detected by a mobile device 110 with a photosensor implemented therein, when the mobile device 110 moves into a line of sight of the light source 120, or alternatively, when the light source 120 is within a field of view of the mobile device 110.

The mobile device 110 may be communicatively linked with a network 140. The mobile device 110 may be able to communicate with other devices via the network 140 through the use of one or more wireless connections, wired connections or a combination thereof. For instance, the network 140 may provide connectivity between the mobile device 110 and one or more servers 142.

The number of mobile devices and servers shown in FIG. 2 is merely illustrative and is not intended to be limiting. Other numbers of the mobile devices or servers are possible as well.

By way of example and without limitation, the mobile device 110 may be a Personal Digital Assistant (PDA) 111, a cell phone 112, a tablet computer 113, a smart phone 114, a laptop computer 115, or a wearable computing system (e.g., glasses 116, any type of near eye display unit, or other type of head-mounted display). Embodiments of the mobile device 110 discussed herein may also be implemented in a cart 117. The mobile device 110 may also take on forms other than those illustrated in FIG. 2. For instance, other examples of the mobile device 110 may include, without limitation, a remote control, a music player, a media player device, a media recorder, a gaming device, a still camera, a video camera, a web cam, and a car key fob.

Server 142 may comprise a single computing device or a cluster-based computing platform, where a number of computers are clustered together. The computers may be physically proximate to one another. For instance, the computers may be positioned on one or more adjacent racks. The computers may also be interconnected to one another by a network switching system that includes one or more switches or routers. One or more related applications may be distributed or replicated among the various computers. One or more servers 142 may be clustered together. The servers 142 may work independently from or collaboratively with each other.

The server 142 may communicate with the mobile device 110, according to one or more network protocols and application-level protocols, to facilitate the use of network-based or cloud-based computing on the mobile device 110.

The mobile device 110 and the servers 142 are considered as nodes on the network 140. The network 140 may comprise routers, switches, gateways, and other devices to facilitate communication of data from one node to another. The network 140 may facilitate direct or indirect communication between the mobile device 110 and the server 142. For instance, the network 140 may route and propagate information between the mobile device 110 and the server 142.

The network 140 may comprise any number of networks including but not limited to the Internet, private networks, personal area networks, local area networks, server provider core networks, metropolitan area networks, wide area networks, and the like. The network 140 may be, e.g., a wireless network, such as the Global System for Mobile Communications/General Packet Radio service (GSM/GPRS), Code Division Multiple Access (CDMA), Enhanced Data Rates for Global Evolution (EDGE), Universal Mobile Telecommunications System (UMTS), or a broadband network such as Bluetooth and Wi-Fi (the brand name for products using IEEE 802.11 standards). Alternatively, the network 140 may be a wired network. Devices, apparatuses, components, units, and the like, within the network 140, may be coupled to each other via a serial bus such as a Universal Serial Bus (USB) or a parallel bus.

With continued reference to FIG. 2, the system 200 may determine location of the mobile device 110 using a centralized computing mechanism or a distributed computing mechanism.

In a centralized computing mechanism, the methods, processes, and techniques disclosed herein may be able to operate entirely on one device alone, e.g., the mobile device 110. For instance, the mobile device 110 may independently store and execute logic to determine its location. The logic generally refers to signals that may be applied to affect operation of a device. Logic may be embodied in computer-readable instructions (e.g., software), circuits, or a combination thereof, among other possibilities.

In a distributed computing mechanism, the methods, processes, and techniques disclosed herein may be distributed among various devices, e.g., between the mobile device 110 and one or more servers 142. In one example, the mobile device 110 and the server 142 may share storage, analysis and processing operations. In another example, the server 142 may offload some processing and storage responsibilities of the mobile device 110. The server 142 may store application data that is used to facilitate the operation of one or more applications performed by the mobile device 110. Some or all information of the mobile device 110 may be transmitted to the server 142 for analysis, processing and storage. As such, the design and requirements of the mobile device 110 may be simplified.

For simplicity of illustration and explanation, the present disclosure will primarily focus on the distributed computing mechanism, e.g., by the collaboration between mobile device 110 and the server 142, from this point forward. However, methods, processes, and techniques described herein may be applied by analogy to the centralized computing mechanism and other computing mechanisms.

3. Example Embodiments of a Light Source

Figure 3:
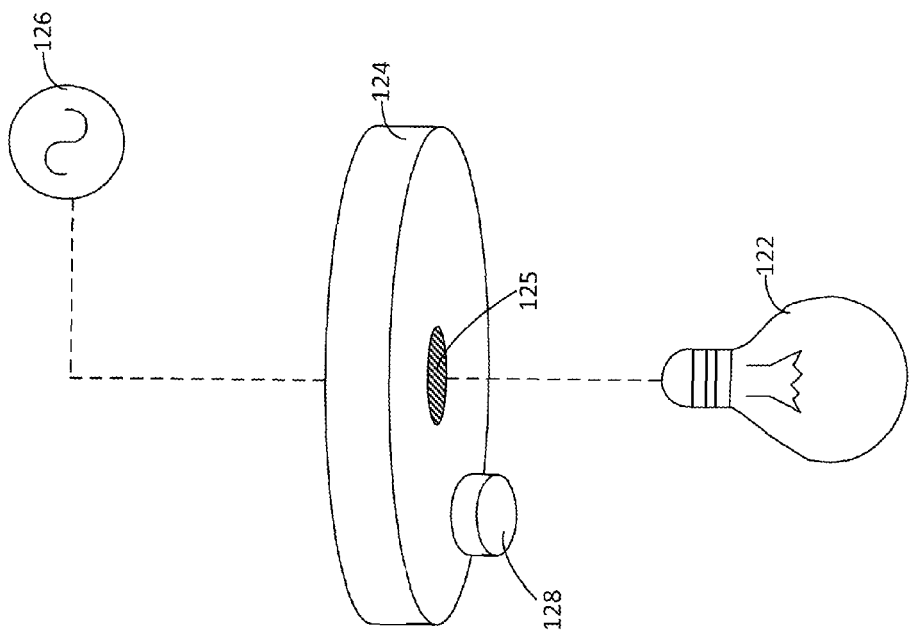
FIG. 3 illustrates an example light source in accordance with aspects of the disclosure.

FIG. 3 is a schematic diagram 300 of a light source 120. The light source 120 may include one or more of the following components: a lamp 122 removably or permanently secured to a light fixture 124, a power source 126 that supplies electricity to the lamp 122, and an add-on device 128. The size and shape of each component of the light source 120 illustrated in FIG. 3 is merely exemplary and many different variations are possible.

The light source 120 may be mounted on a ceiling, a wall, a ground, or furniture, among other possibilities. As illustrated in FIG. 1, when it is mounted on a ceiling, the light source 120 may project a cone-shaped beam towards the ground.

To reduce cost of the light source 120, two or more components of the light source 120 may be assembled together by the manufacturer. For instance, the manufacturer may assemble the add-on device 128 together with the light fixture 124. Detailed description of some example components of the light source 120 is as follows.

3.1 Lamp

The lamp 122 is an electrical device that creates artificial light. For instance, the lamp 122 may emit electromagnetic waves at a visible light spectrum. The electromagnetic waves emitted by the lamp 122 may have wavelengths ranging from about 390 to about 750 nm, and may have a corresponding frequency in the vicinity of 400-790 THz.

By way of example and without limitation, the lamp 122 may be an incandescent lamp, a fluorescent lamp, or an LED lamp with one or more LEDs, among other possibilities.

The emission by the lamp 122 is generally in the form of a beam of light perceivable by naked eye. In some embodiments, the beam width may be as wide as, or wider than 180°. In other embodiments, the beam width may be as narrow as 1°, or somewhere in between. Sometimes the beam width of the light may be limited by the size and shape of the light fixture 124.

3.2 Light Fixture

The light fixture 124 may have a fixture body and a socket 125 defined therein to releasably or permanently receive and accommodate the lamp 122. The light fixture 124 may have a switch to control electrical connection between the lamp 122 and the power source 126.

In one embodiment, the light fixture 124 may be fixedly mounted on a ceiling, a wall, a ground or furniture. In other embodiments, the light fixture 124 may be free-standing or portable. Examples of the light fixture 124 may include but not limited to be a chandelier, pendant light, sconce, under-cabinet light, ceiling fan, emergency lightning, and exit sign.

3.3 Power Source

The power source 126 provides electricity to the lamp 122. By way of example and without limitation, the power source 126 may be an AC or DC source, such as a battery, a wall outlet, USB connection, or a fuel cell, among other possibilities. The power source 126 may power one or more light sources 120, and may provide different voltages to different light sources 120.

The power source 126 may be turned on and off by a switch. Alternatively, although not depicted, the power source 126 may be controlled by a motion detector. The power source 126 may use fuses or other surge protection circuitry.

3.4 Add-on Device

The add-on device 128 may uniquely identify the light source 120 using at least one light attribute. The light attribute may include but not limited to a flicker frequency or an intermittent frequency, light emission frequency, wavelength, and strength (or intensity).

As shown in FIG. 3, the add-on device 120 may be releasably or permanently mounted onto the light fixture 124 or the lamp 122. Although not illustrated, the add-on device may be placed within a cavity of the light fixture 124.

In one embodiment, the add-on device 128 may be electrically coupled to the lamp 122 and the power source 126. The add-on device 128 may include a microchip, switch or circuitry that modifies the current or voltage supplied by the power source 126 to the lamp 122. Due to the intervention of the add-on device 128, the lamp 122 may flicker, that is, the lamp 122 may intermittently emit electromagnetic waves at a particular frequency or set of frequencies. The flicker may be detectable by a photosensor, but not perceivable to naked human eye.

In this embodiment, each light source 120 flickers at a unique frequency different from others. As such, each light source 120 may be differentiated from other light sources based on its unique flicker frequency or its intermittent frequency.

In other embodiments, the add-on device 128 may be a light emission device. As such, in these embodiments, the lamp 122 may be considered as the first light emission device, and the add-on device 128 may be considered as the second light emission device. The add-on device 128 may emit electromagnetic waves in one or more of the following spectra: visible light (e.g., red, blue, and green), infrared, and ultraviolet, among other possibilities. The light emitted by the add-on device 128 may be detected by a sensor on a mobile device 110, e.g., a photosensor, when the mobile device 110 moves into a line of sight of the add-on device 128, or alternatively, when the add-on device 128 is within a field of view of the mobile device 110.

For instance, the add-on device 128 may include an ultraviolet transmitter that emits light in the ultraviolet range. The add-on devices 128 in different light sources 120 may emit electromagnetic waves at different frequencies. For instance, referring to FIG. 1, the add-on device in the light source 120a may emit light at a first ultraviolet frequency, e.g., 30 PHz-40 PHz, whereas the add-on device in the light source 120b may emit light at a second ultraviolet frequency, e.g., 60 PHz-70 PHz. As such, each light source may be differentiated from other light sources based on the light emission frequency of the add-on device 128.

Likewise, instead of or in addition to the light emission frequency, each light source 120 may be uniquely identified by one or more of the following light attributes of the add-on device 128: wavelength and strength (or intensity). For instance, referring to FIG. 1, the add-on device in the light source 120a may emit light at a first ultraviolet wavelength, e.g., 10 nm-30 nm, whereas the add-on device in the light source 120b may emit light at a second ultraviolet wavelength, e.g., 50 nm-70 nm.

The strength or intensity of emission by each add-on device may differ from each other. Further, for any given add-on device 128 or any given light source 120 as a whole, its light intensity gradually decreases over distance.

4. Example Embodiments of a Mobile Device

Figure 4:
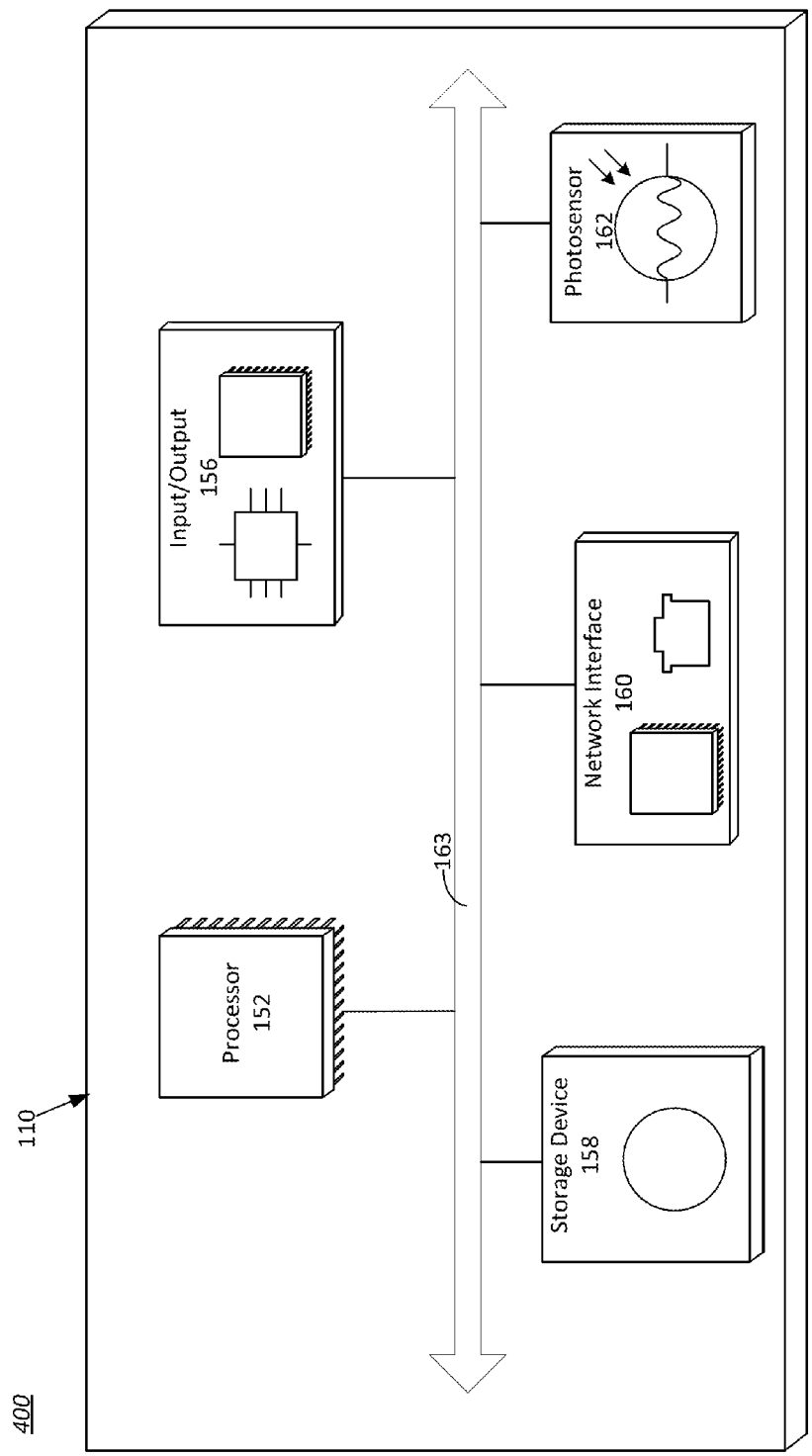
FIG. 4 is an example component diagram of a mobile device in accordance with aspects of the disclosure.

FIG. 4 is a simplified schematic diagram showing some of the components of an example mobile device 110. The mobile device 110 may include one or more of the following components: a processor 152, an input/output device 156, a storage device 158, a network interface 160, and a photosensor 162. Components of the mobile device 110 may be communicatively coupled together in either a wired or wireless fashion. In one example as illustrated in FIG. 4, the components may be coupled together by a system bus 163. Detailed description of some example components of the mobile device is as follows.

4.1 Processor

The processor 152 may control functions of the mobile device 110. For instance, in a centralized computing mechanism, the processor 152 may determine the location of the mobile device 110 based on detection by the photosensor 162. In a distributed computing mechanism, the processor 152 may facilitate transmission of the information detected by the photosensor 162 to the server 142. The processor 152 may also process other functions, such as executing a geo-location related application after determining the location of the mobile device 110.

The processor 152 may be of any type including but not limited to a general purpose processor and a special purpose or dedicated processor, e.g., an application specific integrated circuit (ASIC), a digital signal processor (DSP), a graphical processing unit (GPU), a floating point processing unit (FPU), and the like. The processor 152 may refer to a single processor, or a collection of processors of the same type or various types.

The processor 152 may communicate with individual components of the mobile device 110. In one example, the processor 152 may execute computer-readable instructions or other instructions stored in the storage device 158. Further, the processor 152 may act upon input signals provided by the input/output device 156. For instance, the processor 152 may rely on the user input to control when to determine the location of the mobile device 110. After determining the location of the mobile device 110, the processor 152 may output the result to the input/output device 156.

4.2 Input/Output Device

The input/output device 156 may facilitate device interaction with a user, and may take various forms. The input/output device 156 may include a set of peripherals configured to provide input and output to and from a user of the mobile device 110.

By way of example, the input/out device 156 may include input components such as a keyboard, keypad, touch pad, point device, track ball, joystick, voice recognition device, touch-sensitive surface, microphone, digital camera, mouse, buttons, switch, scroll-wheel, scanner, Global Positioning System (GPS) receiver, movement sensor, location sensor, infrared sensor, optical sensor, Radio Frequency identification (RFID) system, and wireless sensor, among others. The device 156 may provide a number of different types of input data, such as audio data from a microphone, text data from a keypad, video or image data from a camera, and gesture data from a touchpad, just to name a few.

The device 156 may also include output components such as a display, audio transducer, light indicator, tactile transducer, printer, light bulb, and vibration generator, among others.

The display may be any type of display including but not limited to a liquid crystal display (LCD), cathode ray tube display (CRT), light emitting diode display (LED), digital light processing display (DLP), plasma, optical see-through display, optical see-around display, video-see-through display, heads-up display, head-mounted display, flat-panel display, electroluminescent display (ELD), and organic LED (OLED) display, among other possibilities.

The audio transducer may take any form including but not limited to a speaker, headset, jack, earphone, and audio output port, among other possibilities.

Figure 13:
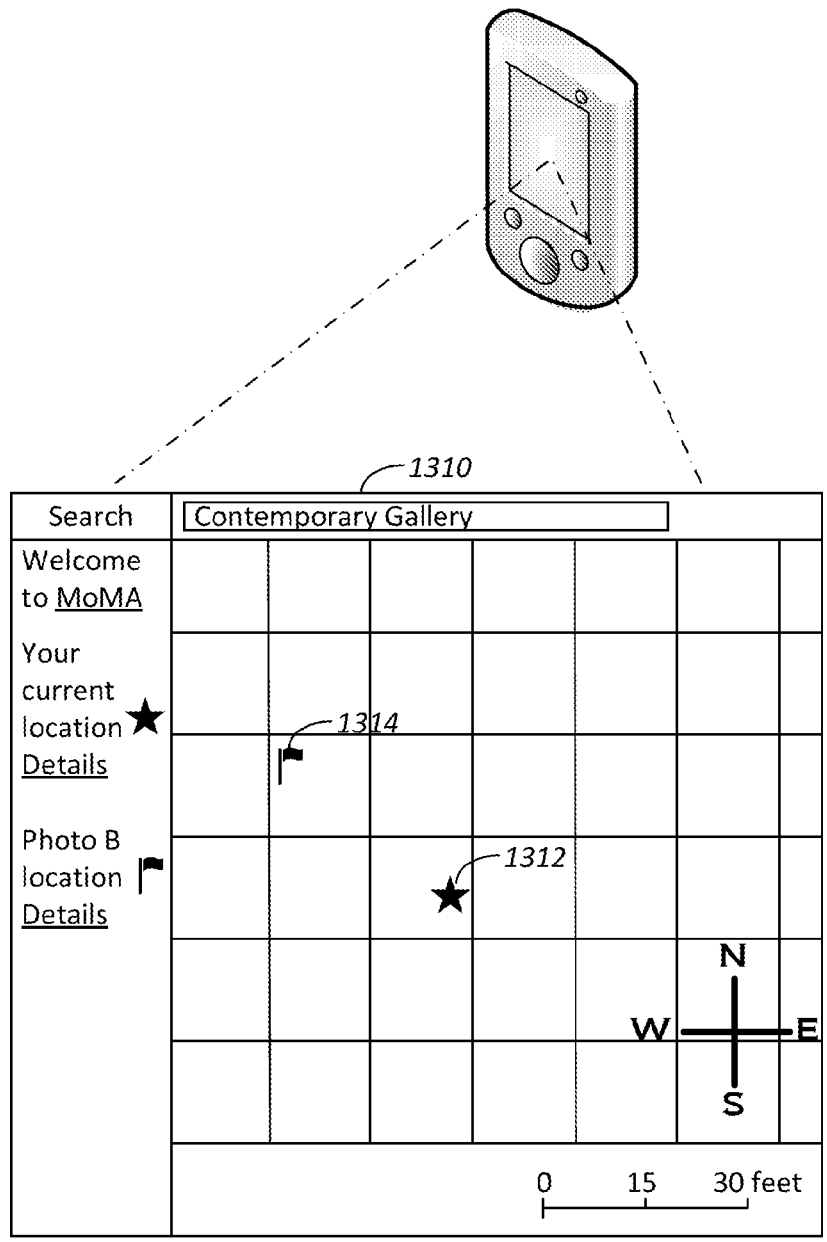
FIG. 13 is an example user interface display of a mobile device.

The device 156 may provide a number of different types of output data, such as visual output via a display, audio output via a speaker, and tactile output via a vibration generator, among others. FIG. 13 provides an example of a visual output shown on a display 1310 of the mobile device 110. In this example, by viewing the display 1310, the user may visualize its current location relative to a target location.

4.3 Storage Device

The storage device 158 provides storage for the mobile device 110 by using one or more non-transitory computer-readable media. A computer readable medium may be a computer-readable storage medium, a tangible storage device, an article of manufacture, or the like. One or more computer readable media may store volatile data, non-volatile data, or a combination thereof.

Some computer readable media may store data for a short period of time. Other computer readable media may store data persistently for a long period of time.

One or more computer-readable media may include primary storage, secondary storage, or a combination thereof. The primary storage may be simply referred to as memory, which is directly accessed by the processor 152. The secondary storage differs from the primary storage in that it is not directly accessible by the processor 152. Rather, data on the secondary storage needs to be transferred to the primary storage in order to be accessed by the processor 152.

The storage device 158 may include one or more computer-readable media of different types. Different types of the computer-readable media may include random-access memory (e.g., SRAM and DRAM), read-only memory (e.g., Mask ROM, PROM, EPROM, and EEPROM), non-volatile random-access memory (e.g. flash memory), a magnetic storage medium, an optical disc, a memory card, a Zip drive, a register memory, a processor cache, a solid state drive (SSD), and a redundant array of independent disks (RAID), among other possibilities The storage device 158 may include one or more computer-readable instructions, data, applications, processes, threads of applications, program modules, software, and the like, that are accessible or executable by the processor 152 to perform at least part of the herein-described methods and techniques. The processor 152 may read and write data during execution of the computer-readable instructions.

4.4 Network Interface

The network interface 160 allows the mobile device 110 to communicate, using analog or digital modulation, with other devices or servers 142, on a network, such as the network 140. The network interface 160 may include transmitters, receivers, and antennas, among others, to enable communication via the network 140. The network interface 160 may take the form of a wireless interface, a wireline interface, or a combination thereof, through which the mobile device 110 can connect to the network 140.

A wireless interface may include one or more wireless transmitters, receivers, transceivers, and the like, configurable to communicate to a wireless network using one or more wireless communication standards. Example wireless transceivers may include but not limited to a BLUETOOTH® transceiver, a Zigbee transceiver, a Wi-Fi transceiver, a WiMAX transceiver, and an infrared transceiver, among other possibilities. Example wireless communication standards include but not limited to BLUETOOTH®, Wi-Fi (802.11), 3G cellular communication standards (e.g., GSM, GPRS, CDMA, EV-DO, and/or HSPDA), and 4G cellular communication standards (e.g., LTE and WiMAX (802.16)), among other possibilities.

A wireline interface may include one or more wireline transmitters, receivers, transceivers, and the like, configurable to communicate via a twisted pair wire, a coaxial cable, a fiber-optic link, or a similar physical connection to a wireline network. Example wireline transceivers may include but not limited to an Ethernet transceiver and a Universal Serial Bus (USB) transceiver.

4.5 Photosensor

The photosensor 162 is an onboard sensor which may be used (e.g., in combination with software) to determine a location of the mobile device 110 in an indoor space. The photosensor 162 may be a light reception device. The photosensor 162 may detect the presence of visible light, infrared, or ultraviolet light emissions.

Examples of the photosensor 162 may include, but not limited to, a photodiode (e.g., a silicon p-i-n photodiode), bipolar phototransistor, and photoFET (photosensitive field-effect transistor). The photosensor 162 may include a semiconductor having a property called photoconductivity, in which the electrical conductance may vary depending on the intensity of light emissions striking the material.

When the mobile device 110 or the photosensor 162 moves into the line of sight of a light source 120, or when the light source 120 is within the field of view of the photosensor 162, the photosensor 162 may detect the electromagnetic waves emitted from the light source 120. The photosensor 162, in some instances together with the processor 152, may determine light attributes associated with the detected electromagnetic waves, including one or more of the following: flick frequency or intermittent frequency, light emission frequency, wavelength, and strength (or intensity), among other possibilities.

The photosensor 162 may pass the detected light attributes to the processor 152 or the server 142 for further processing to determine location of the mobile device 110.

Sometimes the photosensor 162 may be in the line of sight of multiple light sources 120. As such, the photosensor 162 may detect electromagnetic waves emitted from multiple light sources 120, and determine light attributes associated with the multiple light sources 120.

4.6 Variation of Components

The components of the mobile device 110 discussed with reference to FIG. 4 are merely illustrative, and are not intended to be limiting. One or more of the components may be combined.

In some examples, additional functional or physical components may be added to the example illustrated in FIG. 4. For instance, the mobile device 110 may include a geographic position component, e.g., a global positioning system (GPS) transceiver, a gyroscope, an accelerometer, a compass, a pedometer, and a magnetic field detector, among other possibilities. The accelerometer may measure the acceleration of gravity of the mobile device 110. The gyroscope may output readings to facilitate a determination of an orientation of the mobile device 110. The mobile device 110 may use data from the gyroscope and input from the accelerometer to determine the mobile device's pitch, yaw or roll relative to a direction of gravity. The mobile device 110 may use the compass to estimate the mobile device's orientation. The mobile device 110 may use the pedometer to gauge the approximate distance travelled on foot by registering the number of steps taken.

One or more components of the mobile device 110 may be physically separate from the mobile device 110 or physically distant from the remaining components.

5. Example Server

The server 142 may refer to a single computing device residing in a single computing center, or may refer to multiple computing devices residing in one or multiple computing centers at disparate geographic locations.

Figure 5:
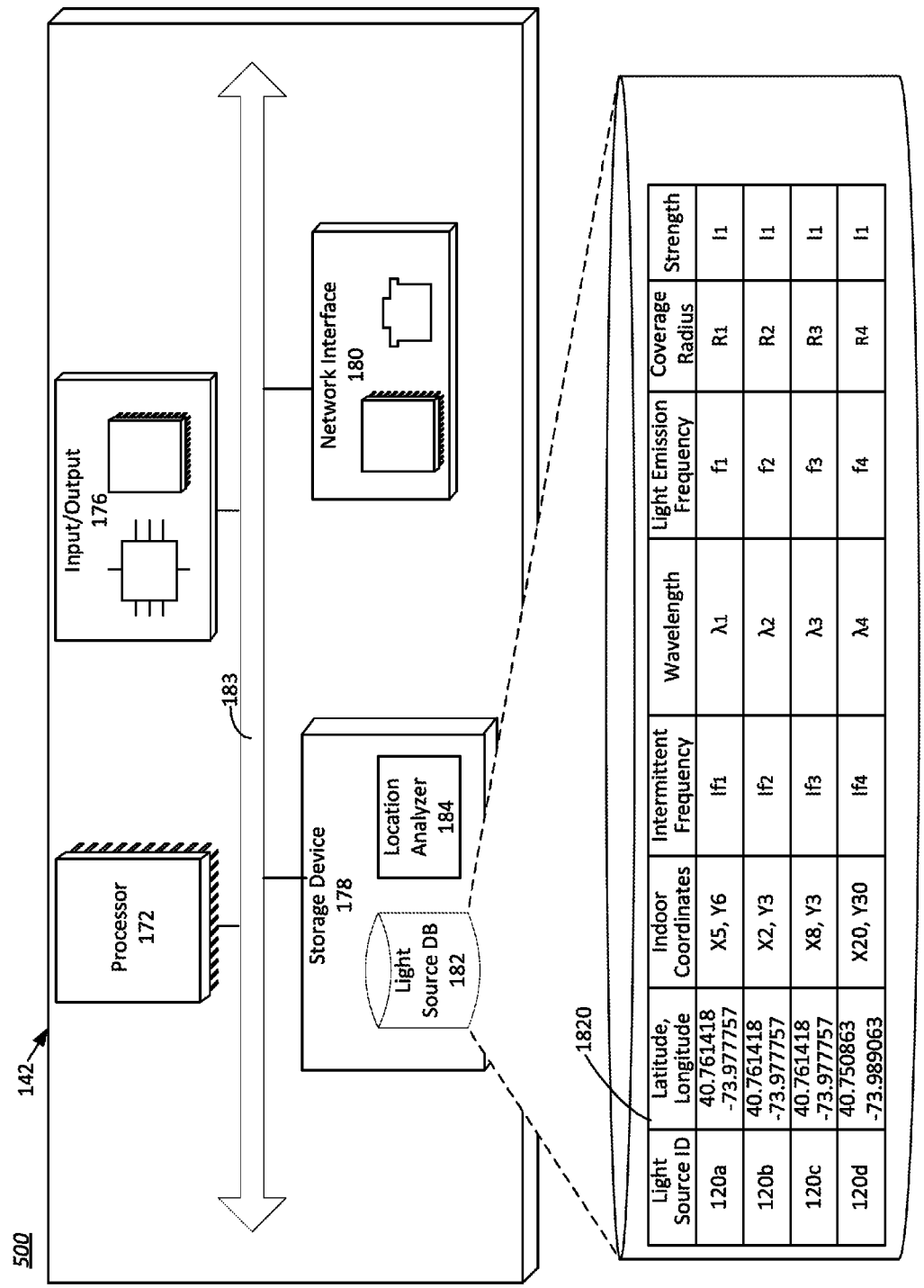
FIG. 5 is an example component diagram of a server in accordance with aspects of the disclosure.

Referring to FIG. 5, the server 142 may for example include one or more of the following components: a processor 172, an input/output device 176, a storage device 178, and a network interface 180, among other possibilities. One or more of the above components may have characteristics similar to that of the mobile device 110.

The server 142 may store computer-readable instructions, data, applications (e.g., cloud-based applications), processes, threads of applications, program modules, software, services, and the like, that are accessible via the network 140.

In one example, the storage device 178 of the server 142 may include logic that determines location of a mobile device. One example of the logic is a location analyzer 184. The location analyzer 184 may determine the location of a mobile device 110 by performing one or more of the following steps: (1) identifying one or more light sources based on light detected by the photosensor, and (2) determining location of the photosensor or the mobile device based on the detected light.

Examples of data stored in the storage device 178 may include but not limited to variables, results, possible results, identifiers, information correlating identifiers, and database information. More specifically, the storage device 178 may include a light source database 182. The light source database 182 may include one or more tables 1820. Each row in the table 1820 may record information associated with a light source 120. Such information may include one or more of the following: a unique identifier of the light source (e.g., light source ID), geolocation including latitude and longitude of the light source, coverage radius of the light source, indoor coordinate (i.e., location of the light source in an indoor space), intermittent frequency, wavelength, light emission frequency, and strength of the electromagnetic waves emitted by the light source, among other possibilities. Each light source ID uniquely identifies the light source associated therewith. The light source ID may be an alpha-numerical code (e.g., 120a), a device serial number, or a device name.

Figure 6:
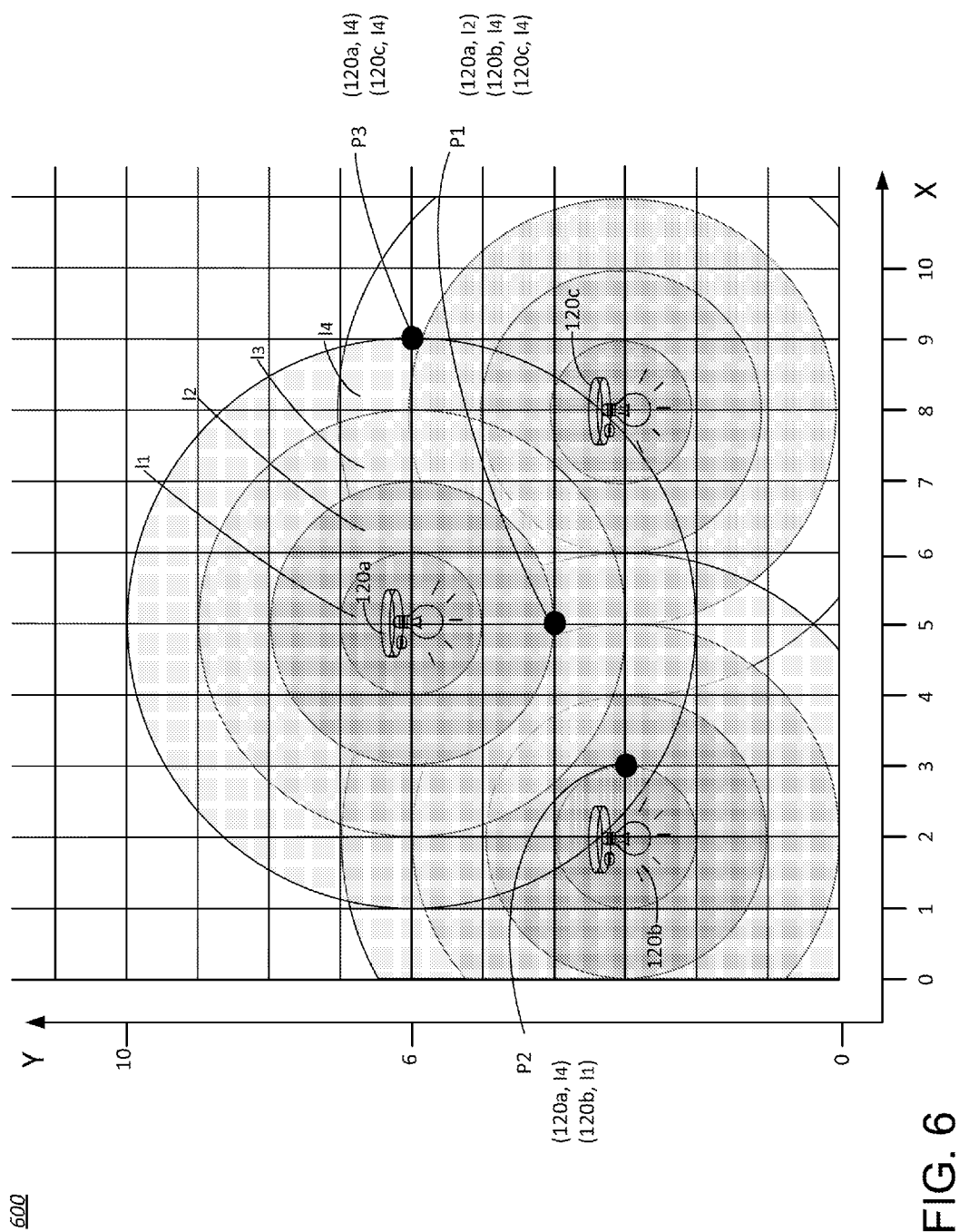
FIG. 6 is an example map denoting positions in an indoor environment relative to light sources.

In addition, the storage device 178 may also include one or more maps 600 as illustrated in FIG. 6. Each map may be constructed on any of the various scales, e.g., international, national, or local. Alternatively, each map 600 may simply be a floor map of an indoor space, and may include landmarks in the indoor space. Different maps may correspond to different indoor spaces.

The map 600 may include an indoor coordinates system, and each point on the map 600 may be associated with a pair of indoor coordinates (X, Y). At least one point may also be associated with light information expected to be detected or light information detectable at that point. The expected light information may include the light source(s) and their light intensities expected to be detected at that particular point. As described earlier, the light intensity of each light source progressively decreases over distance. For example, the light intensity for each of the light sources 120a-c may progressively decrease from a high intensity I1 to a low intensity 14 over distance.

For demonstration purposes only, FIG. 6 illustrates three points P1, P2, and P3, and their respective expected light information. At point P1 (X5, Y4), the expected light information may include the expected light intensity 12 from the light source 120a, the expected light intensity 14 from the light source 120b, and the expected light intensity 14 from the light source 120c.

At point P2 (X2, Y3), the expected light information may include the expected light intensity 14 from the light source 120a, and the expected light intensity I1 from the light source 120b.

At point P3 (X9, Y6), the expected light information may include the expected light intensity 14 from the light source 120a, and the expected light intensity 14 from the light source 120c.

The expected light information for one or more points may be collected by a collecting device with a photosensor that visits one or more points on the map 600. Each point may be associated with a unique set of radiation information.

Based on the map 600, after receiving detected light attributes from a photosensor or a mobile device, the server 142 may compare the detected light attributes with the expected light information of each point on the map 600. The server 142 may find the point on the map 600 whose expected light information closely matches the detected light attributes. The server 142 may regard that point or the vicinity thereof as the position of the photosensor or the mobile device 110.

While the map 600 is constructed based on three light sources 120a, 120b and 120c, any number of light sources may be used. Based on the number of light sources, the map 800 may include significantly more or less details.

The light source database 182, the location analyzer 184, and one or more maps described above may be implemented in one or more servers 142.

6. Example Logic and Methods of Operation

As described earlier, in a distributed computing mechanism, the server 142 may include a location analyzer 184 that implements a process to determine the location of a mobile device 110. The location analyzer 184 may be implemented by Application specific Integrated Circuits (ASICs), Field Programmable Gate Arrays (FPGAs), digital signal processors (DSPs), integrated circuits, modules, segments, computer-readable instructions, firmware, or a combination thereof, among other possibilities. Further, the location analyzer 184 may be implemented in a signal bearing non-transitory medium in a variety of forms.

Figure 7:
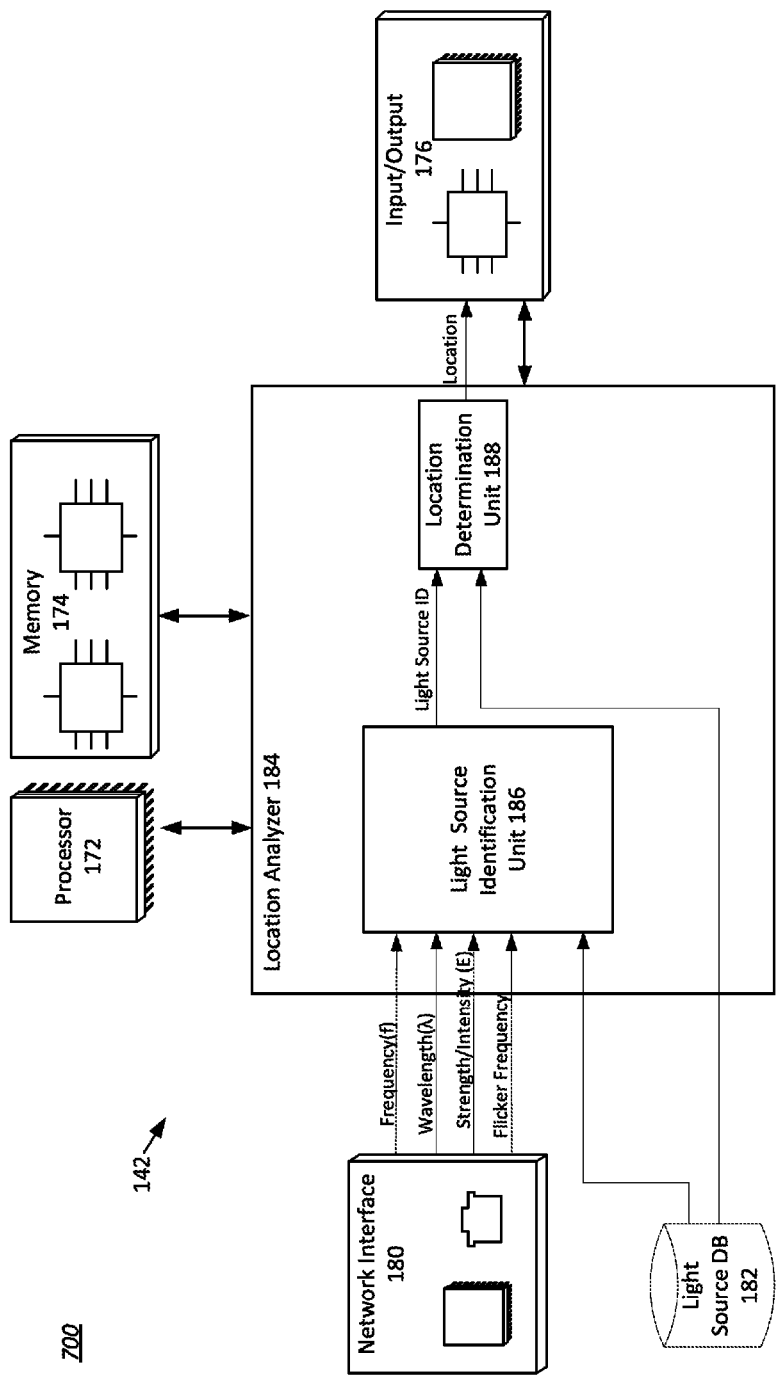
FIG. 7 is a block diagram of an example implementation of a location analyzer implemented in the server.

FIG. 7 shows an example of the server 142 that implements the location analyzer 184. As shown in FIG. 7, the location analyzer 184 may include one or more of the following units: a light source identification unit 186 and a location determination unit 188.

Methods of operation performed by the location analyzer 184 and its individual units 186 and 188 are discussed in connection with the flow charts illustrated in FIGS. 8-9. Methods illustrated in one or more of the flow charts may be executed by a processor, e.g., the processor 172. In some examples, methods illustrated in each flow chart may be carried out periodically, continuously, as needed, as triggered, or in another manner.

As shown in the flow charts, each method may include one or more operations, functions, or actions as illustrated by one or more of the blocks. A block may represent a process of information, a transmission of information, or a combination thereof. As an example, a block may be implemented by circuitry, modules, segments, computer-readable instructions executed by a processor, or a combination thereof.

The flow charts discussed below are merely illustrative and are not intended to be limiting. For instance, although the blocks are illustrated in a sequential order, these blocks may also be performed in parallel or in a different order than those described herein, depending on the functionalities involved. Also, the various blocks may be combined into fewer blocks, divided into additional blocks, or omitted based upon the desired implementation. Further, blocks illustrated in various flow charts may be combined with one another, in part or in whole, based on the functionalities involved.

Figure 8:
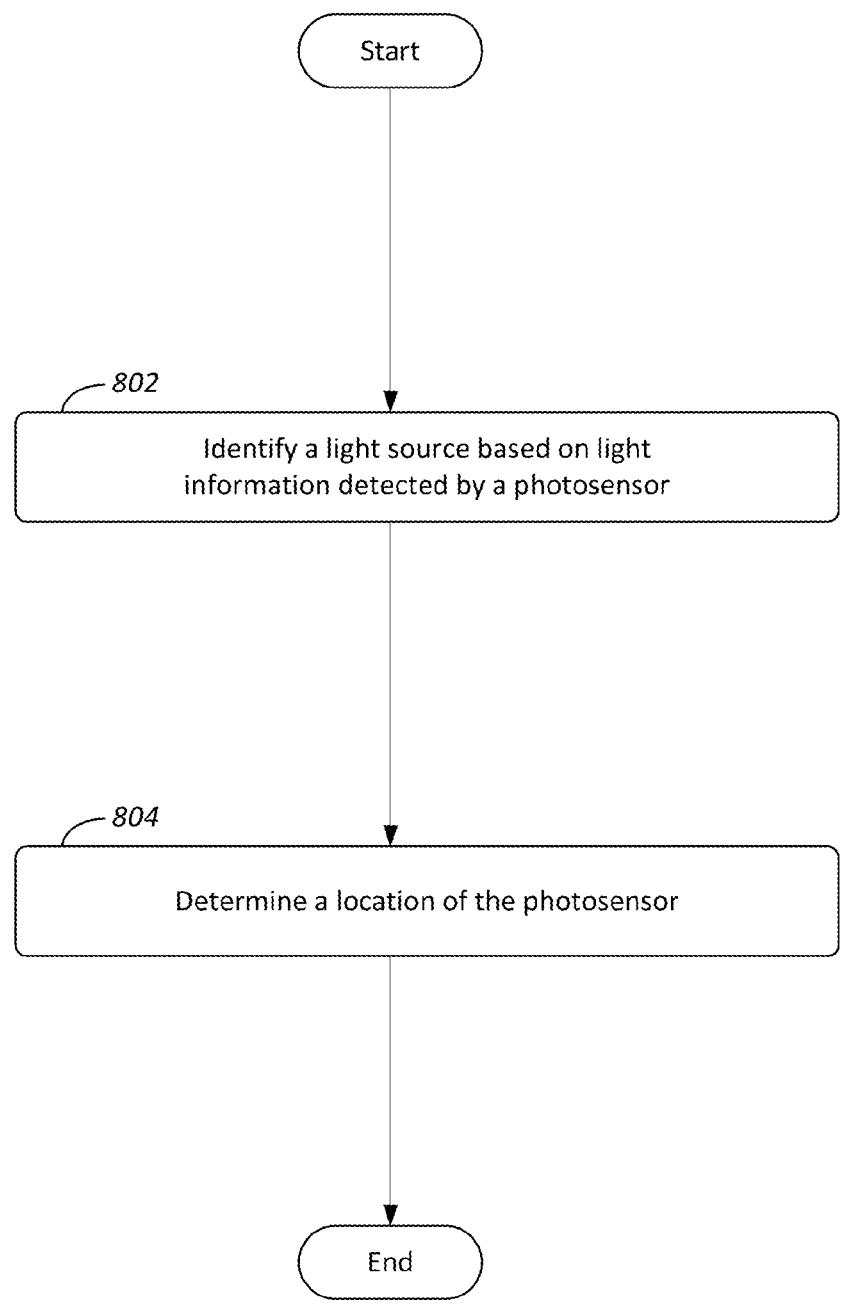
FIG. 8 is a flow chart of a process performed by the location analyzer.

FIG. 8 is a flow chart that illustrates an embodiment of an overall method of operation of the location analyzer 184. At block 802, the light source identification unit 186 may identify one or more light sources based on light information detected by the photosensor 162 of the mobile device 110. The light information detected by the photosensor 162 may include one or more of the following light attributes: flicker frequency or intermittent frequency, light emission frequency (f), wavelength (A), and strength/intensity (E), among other possibilities. The mobile device 110 may transmit the detected light information to the server 142 via the network 140. The data provided by the mobile device 110 to the server 142 may be encoded or cryptographically signed for security purposes. By providing encoded or cryptographically signed data, the ability for a third party to disrupt the transmission may be mitigated.

The server 142 may receive the above information at the network interface 180 and then send the information to the identification unit 186. After receiving the detected light information, the identification unit 186 may look up the light source database 182 to identify the light source(s) associated with the detected light information. In a first example, the photosensor 162 detects two light emissions: a first light emission having an intermittent frequency of If1, and a second light emission having an intermittent frequency of If2. The identification unit 186 may look up the table 1820 of the light source database 182 to identify the light source that emits each of the two emissions. According to the table 1820, the light source 120a emits the first emission, and the light source 120b emits the second emission.

In a second example, the photosensor 162 detects three light emissions, a first light emission having a light emission frequency of f1, a second light emission having a light emission frequency of f2, and a third light emission having a light emission frequency of f3. By looking up the table 1820 of the light source database 182, the identification unit 186 may determine that the light sources 120a, 120b, and 120c emit the first, second, and third light emissions, respectively.

With continued reference to FIG. 8, at block 804, after the identification unit 186 identifies the light sources associated with the light information detected by the photosensor, the location determination unit 188 may determine the location of the photosensor. The location of the photosensor may be estimated by various mechanisms, such as by relying on triangulation algorithms, or by relying on an indoor map. Detailed description of each mechanism is discussed below.

Figure 9:
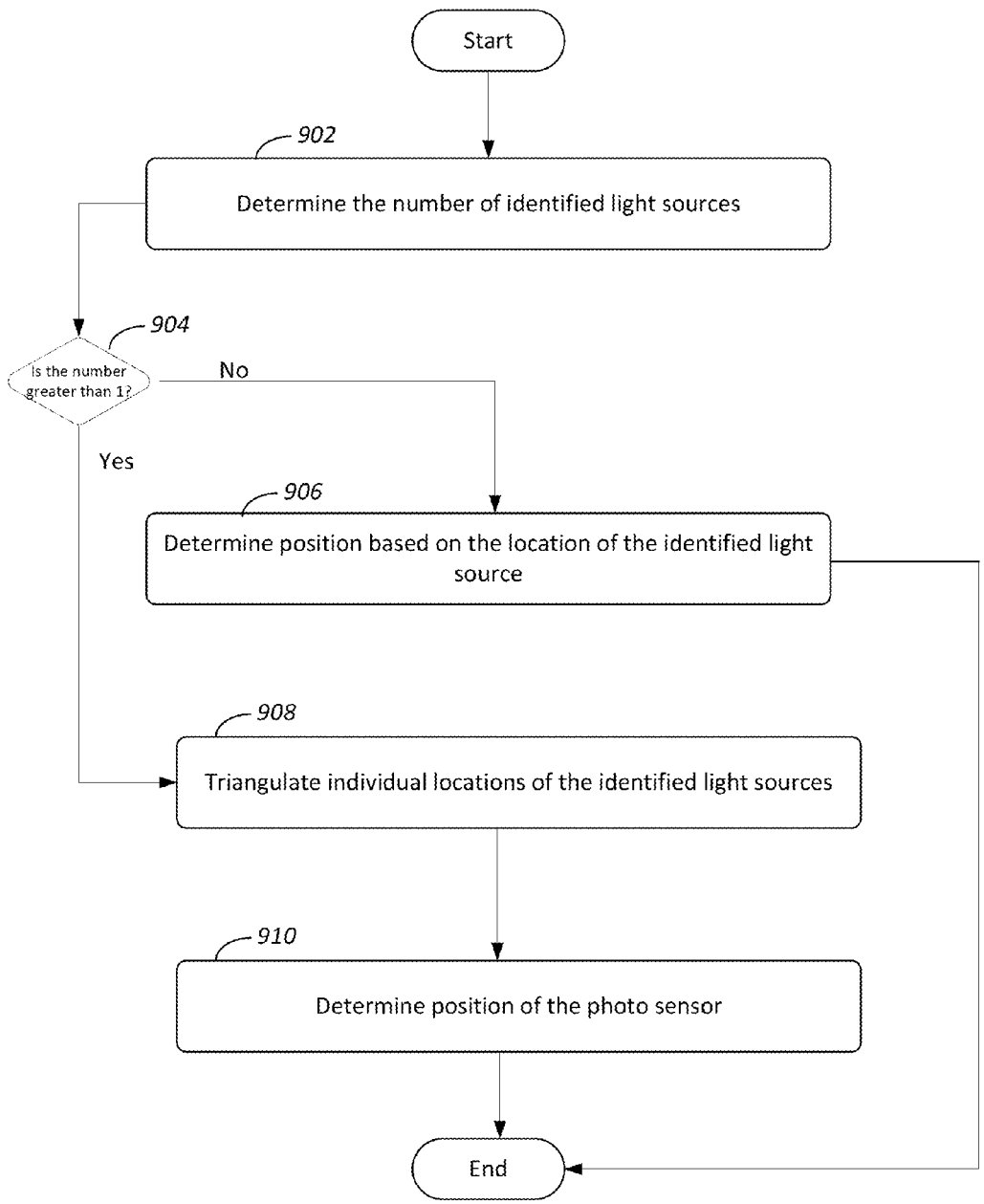
FIG. 9 is a flow chart of a process performed by a location determination unit of the location analyzer.

The flow chart 900 of FIG. 9 illustrates a process that incorporates the triangulation algorithms. At block 902, the identification unit 188 may determine the number of light sources identified by the identification unit 186. The location determination unit 188 then determines the location of the photosensor based on the number of the identified light sources. If the number is not greater than 1 as determined by block 904, the location determination unit 188 may proceed to block 906, at which the unit 188 may determine the photosensor is within a close proximity of the identified light source. On the other hand, if the number is greater than 1, the location determination unit 188 may proceed to block 908, at which the unit 188 may triangulate individual locations of each identified light source, and determine the photosensor's location at block 910 based on the triangulation.

Figure 10:
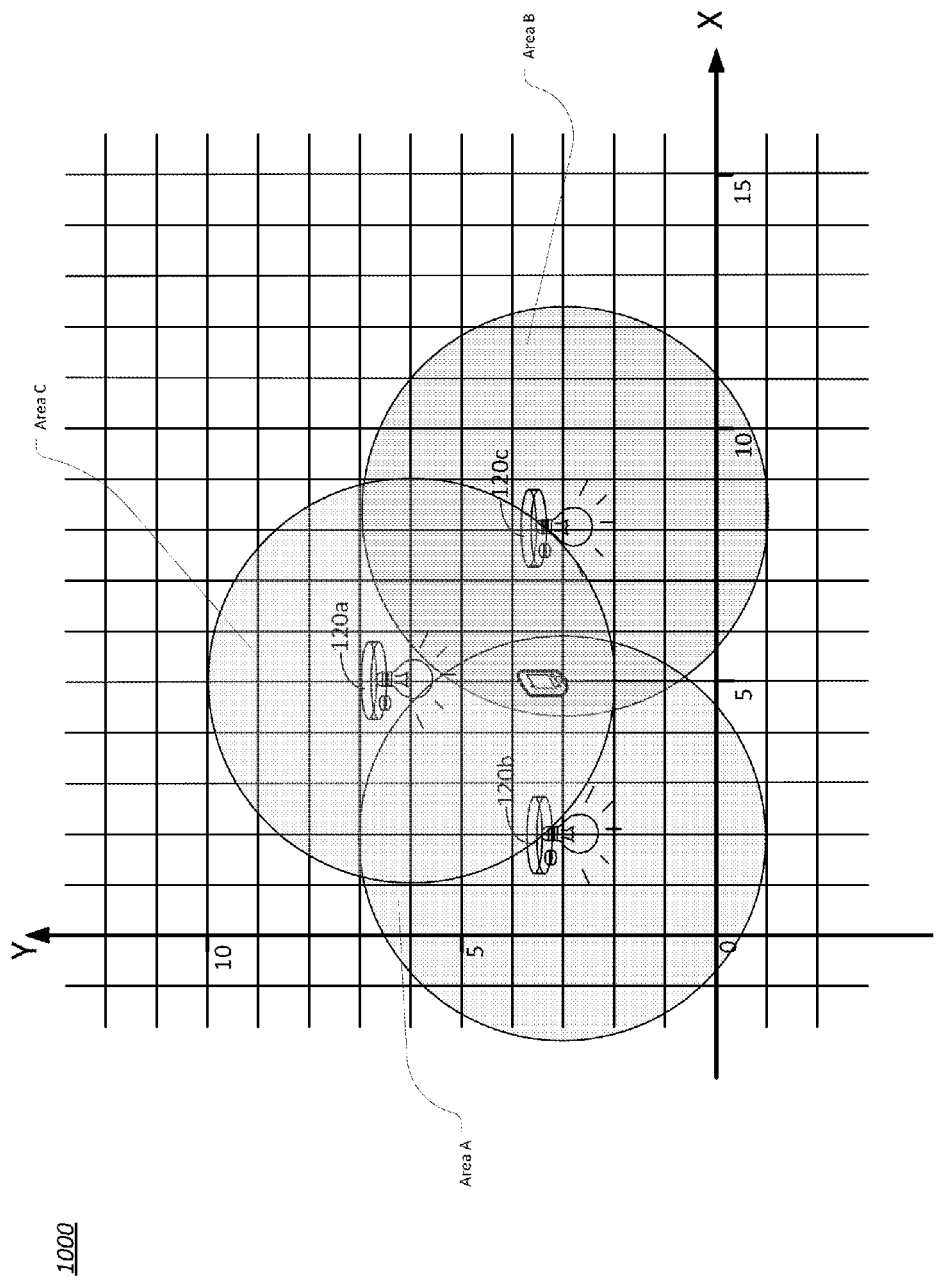
FIG. 10 is a planar view of the indoor space of FIG. 1.

FIG. 10 is a planar view of the indoor space of FIG. 1. Each light source may have a symmetrical or asymmetrical coverage area. In the former case, the coverage area of each light source may be represented by a circle having a radius identical to the coverage area of the light source. The coverage area associated with each light source may differ from that of other light sources. In FIGS. 1 and 10, the coverage areas of the light sources 120a-c are illustrated as Areas A-C, respectively. The triangulation mechanism referred above at blocks 908-910 may rely on the location and coverage area of each identified light source, estimate an intersection area of the coverage areas of all the identified light sources, and estimate the photosensor's location within the intersection area.

In another embodiment, after the identification unit 186 identifies the light sources associated with the radiation information detected by the photosensor, the location determination unit 188 may determine the photosensor's location by looking up one or more indoor maps, such as map 600 of FIG. 6. As discussed earlier, one or more points on the map 600 may be associated with expected light information. The location determination unit 188 may compare the detected light information to the expected light information associated with various points on the map, and determine the closest match. The point on the map that has the closest match may be output as the location of the mobile device 110.

Once the location analyzer 184 determines the location of the mobile device, the location analyzer 184 may output the determined location to the input/output device 176, or transmit the determined location to the mobile device 110 via the network 140. The server 142 and the mobile device 110 may rely on the location of the mobile device 110 to take further actions, such as executing other related applications.

7. Other Implementations

The implementation of the location analyzer 184 described above with respect to the units 186-188, and the processes described therein, are merely illustrative and are not meant to be limiting. The location analyzer 184 may include other units or variations thereof. For instance, one or more of the described units 186-188 of the location analyzer 184 may be divided into additional units, or may be combined.

The methods, processes, and techniques described above regarding determination of the location of the mobile device 110 are achieved by the collaboration between the mobile device 110 and the server using the distributed computing mechanism. In alternate embodiments, the above methods, processes and techniques may be implemented entirely in the mobile device 110, such that the mobile device 110 can independently determine its location.

Figure 11:
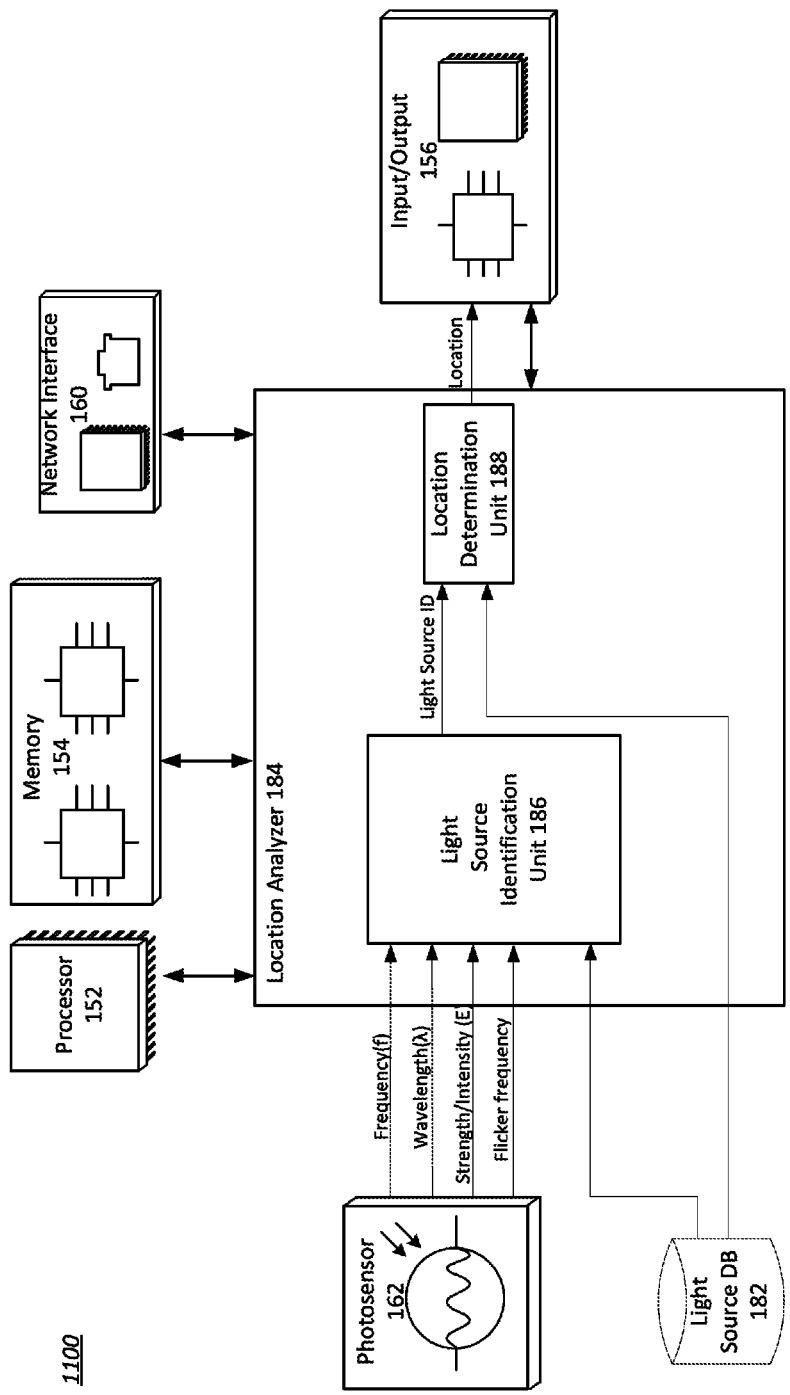
FIG. 11 is a block diagram of an example implementation of a location analyzer implemented in a mobile device according to aspects of the disclosure.
Figure 12:
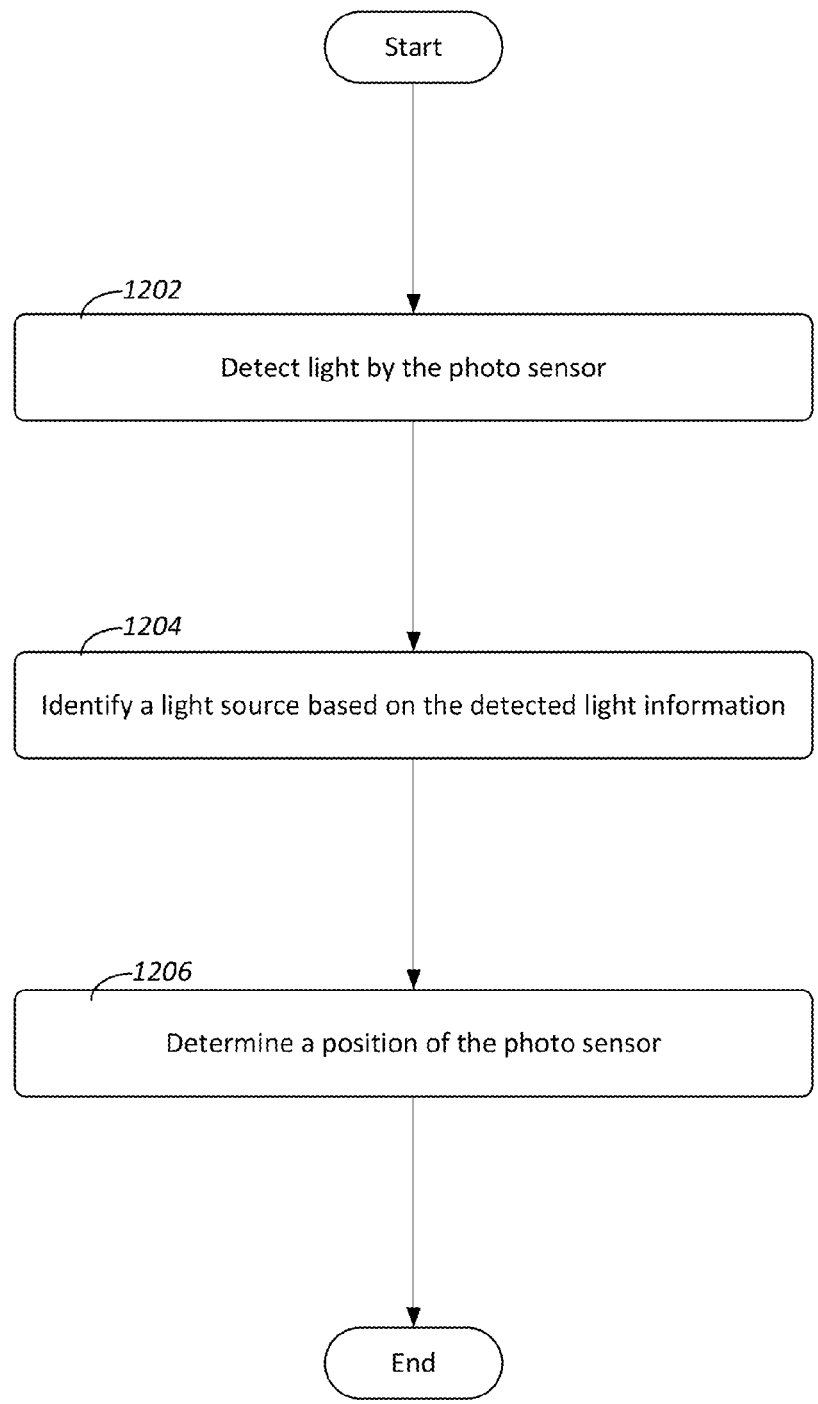
FIG. 12 is a flow chart of a process performed by a mobile device according to aspects of the disclosure.

For instance, as illustrated in FIG. 11, the mobile device 110 may be implemented with the light source database 182, the location analyzer 184, and one or more floor maps 600. In operation as illustrated in FIG. 12, the mobile device 110 may detect light emissions using the photosensor 162 at block 1202. At block 1204, the mobile device 110 may identify one or more the light source(s) based on light attribute(s) detected by the photosensor 162. Subsequently, the mobile device 110 may estimate its current location at 1206. The mobile device 110 may rely on the determined location to take further actions, such as executing other related applications.

8. Example Use Scenario

The methods, processes, and techniques described above may provide an accurate determination of a user or a mobile device in an indoor environment. The location analyzer 184 and its process may support or be used in conjunction with a wide range of mobile applications, including but not limited to, location positioning, location navigation, location-aware searching, commerce, and advertising applications, among other possibilities. For instance, once the location analyzer 184 outputs a mobile device's current location, such information may be used by other related applications, such as advertisements.

A specific use scenario of the location analyzer 184 is discussed next in conjunction with FIG. 13, which illustrates an exemplary display 1310 of the mobile device 110. In this scenario, the location analyzer 184 may be implemented as part of a virtual tour guide of the Museum of Modern Art (MoMA). First, the mobile device 110 may pinpoint the user's current position 1312 on an interior map of the MoMA on the display 1310. As the user navigates through the MoMA, the photosensor on the mobile device 110 may continuously provide detected radiation information to the location analyzer 184. The location analyzer 184 may in turn determine the user's location in real time or quasi-real time, and may determine the landmark closest to the user. Once the location analyzer 184 determines that the user stands before a landmark, the virtual tour guide may automatically provide visual or audio explanations about the landmark.

Further, the location analyzer 184 may assist the user to navigate to a target point of interest. For instance, the user may select a point of interest, e.g., "Contemporary Gallery," in the search box, as the target position. Next, the mobile device 130 may display the position of the Contemporary Gallery 1314 on the display 1310. The mobile device 130 may use the location analyzer 184 described above to continuously determine the user's location, and may display on the screen 1310 the user's location in real or quasi-real time relative to the target position 1314.

9. Conclusion

Although aspects of the disclosure herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method of determining a location of a mobile device comprising:

accessing location information, the location information identifying a plurality of indoor coordinates and, for each indoor coordinate, an intensity of light expected to be detected by the mobile device at the indoor coordinate from a first light source and an intensity of light expected to be detected by the mobile device at the indoor coordinate from a second light source, each light source being (a) configured to provide illumination of an indoor space, (b) identifiable by emitting a unique light attribute in conjunction with the illumination, and (c) disposed at a distance from the plurality of indoor coordinates such that the intensity of light expected to be detected at each indoor coordinate is less than the intensity of light at the light source and progressively decreases as the distance from the light source increases;

identifying, by one or more processors and based on light information detected by the mobile device, the first light source based on a first light attribute emitted by the first light source and a second light attribute emitted by the second light source, the first light attribute being different from the second light attribute;

detecting, with the mobile device and by the one or more processors, the intensity of light received at the mobile device from the first light source and the intensity of light received at the mobile device from the second light source; and determining the location of the mobile device based on a comparison, by the one or more processors, of the intensity of light from the first and second light sources detected by the mobile device with the intensity of light from the first and second light sources that is expected to be detected at one or more of the plurality of indoor coordinates.

2. The method of claim 1, wherein the unique light attribute comprises light emission frequency.

3. The method of claim 2, wherein the unique light attribute comprises ultraviolet light and the first light source emits ultraviolet light at a different frequency than the second light source.

4. The method of claim 1, wherein determining the location of the mobile device further comprises determining a location associated with the first light source and a location associated with the second light source, and triangulating the location associated with the first light source and the location associated with the second light source the second light source.

5. The method of claim 1, wherein the unique light attribute is not perceivable by a user's naked eye.

6. The method of claim 1, wherein the unique light attribute comprises flicker frequency.

7. The method of claim 1, wherein determining the location of the mobile device further comprises selecting one of the indoor coordinates identified by the location information as the location of the mobile device.

8. The method of claim 7, wherein the selected indoor coordinate is the indoor coordinate whose associated intensity of light expected to be detected from the first and second light sources closely matches the intensity of light detected by the mobile device from the first and second light sources, respectively.

9. A system for determining a location of a mobile device comprising:

a storage device storing location information, the location information identifying a plurality of indoor coordinates and, for each indoor coordinate, an intensity of light expected to be detected by the mobile device at the indoor coordinate from a first light source and an intensity of light expected to be detected by the mobile device at the indoor coordinate from a second light source, each light source being (a) configured to provide illumination of an indoor space, (b) identifiable by emitting a unique light attribute in conjunction with the illumination, and (c) disposed at a distance from the plurality of indoor coordinates such that the intensity of light expected to be detected at each indoor coordinate is less than the intensity of light at the light source and progressively decreases as the distance from the light source increases; and one or more processors in communication with the storage device configured to:

identify based on light information detected by the mobile device, the first light source based on a first light attribute emitted by the first light source and a second light attribute emitted by the second light source, the first light attribute being different from the second light attribute;

detect, with the mobile device, the intensity of light received at the mobile device from the first light source and the intensity of light received at the mobile device from the second light source; and determine the location of the mobile device based on a comparison of the intensity of light from the first and light sources detected by the mobile device with the intensity of light from the first and second light sources that is expected to be detected at one or more of the plurality of indoor coordinates.

10. The system of claim 9, wherein the unique light attribute comprises light emission frequency.

11. The system of claim 10, wherein the unique light attribute comprises ultraviolet light and the first light source emits ultraviolet light at a different frequency than the second light source.

12. The system of claim 11, wherein determining the location of the mobile device further comprises selecting one of the locations identified by the location information as the location of the mobile device.

13. The system of claim 12, wherein the selected indoor coordinate is the indoor coordinate whose associated intensity of light expected to be detected from the first and second light sources closely matches the intensity of light detected by the mobile device from the first and second light sources, respectively.

14. The system of claim 9, wherein the location of the mobile device is further determined by determining a location associated with the first light source and a location associated with the second light source and triangulating the determined location associated with the first light source and the location associated with the second light source.

15. The system of claim 9, wherein the unique light attribute is not perceivable by a user's naked eye.

16. The system of claim 9, wherein the unique light attribute comprises flicker frequency.

17. A non-transitory computing-device readable storage medium on which processor-readable instructions of a program are stored, the instructions, when executed by one or more processor, causing the one or more processor to perform a method, the method comprising:

accessing location information, the location information identifying a plurality of indoor coordinates and, for each indoor coordinate, an intensity of light expected to be detected by a mobile device at the indoor coordinate from a first light source and an intensity of light expected to be detected by the mobile device at the indoor coordinate from a second light source, each light source being (a) configured to provide illumination of an indoor space, (b) identifiable by emitting a unique light attribute in conjunction with the illumination, and (c) disposed at a distance from the plurality of indoor coordinates such that the intensity of light expected to be detected at each indoor coordinate is less than the intensity of light at the light source and progressively decreases as the distance from the light source increases;

identifying, by one or more processors and based on light information detected by the mobile device, the first light source based on a first light attribute emitted by the first light source and a second light attribute emitted by the second light source, the first light attribute being different from the second light attribute;

detecting, with the mobile device and by the one or more processors, the intensity of light received at the mobile device from the first light source and the intensity of light received at the mobile device from the second light source; and determining the location of the mobile device based on a comparison, by the one or more processors, of the intensity of light from the first and light sources detected by the mobile device with the intensity of light from the first and second light sources that is expected to be detected at one or more of the plurality of indoor coordinates.

18. The medium of claim 17, wherein the unique light attribute is not perceivable by a user's naked eye.

19. The medium of claim 17, wherein determining the location of the mobile device further comprises selecting one of the indoor coordinates identified by the location information as the location of the mobile device.

\* \* \* \* \*